R. P. THOMPSON.
SPRING SUSPENSION.
APPLICATION FILED FEB. 18, 1914.

1,158,585.

Patented Nov. 2, 1915.
3 SHEETS—SHEET 1.

WITNESSES:
E. B. Gilchrist
L. I. Porter

Ralph P. Thompson
INVENTOR.
BY Thurston & Kwis
ATTORNEYS.

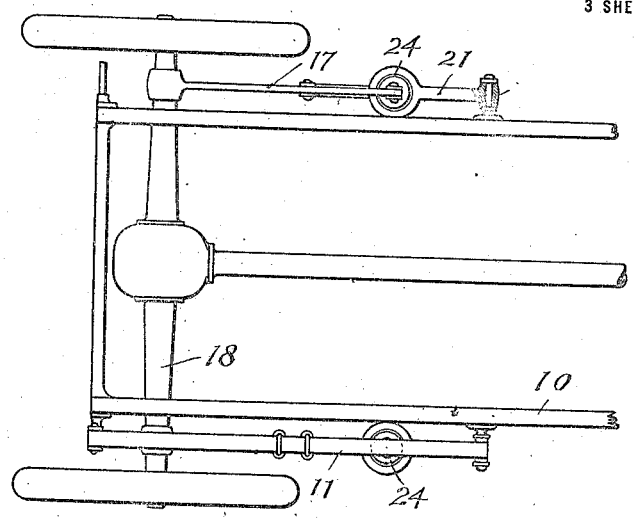
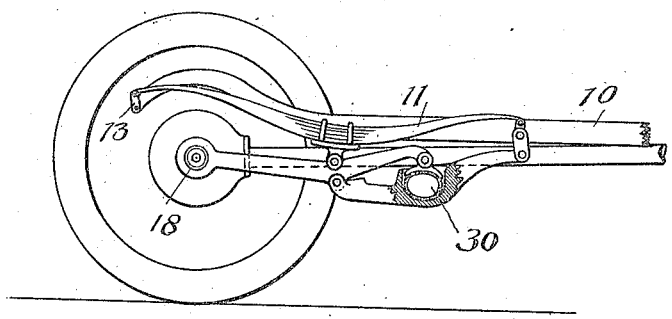

UNITED STATES PATENT OFFICE.

RALPH P. THOMPSON, OF LEIPSIC, OHIO.

SPRING SUSPENSION.

1,158,585. Specification of Letters Patent. Patented Nov. 2, 1915.

Application filed February 18, 1914. Serial No. 819,329.

*To all whom it may concern:*

Be it known that I, RALPH P. THOMPSON, a citizen of the United States, residing at Leipsic, in the county of Putnam and State of Ohio, have invented a certain new and useful Improvement in Spring Suspension, of which the following is a full, clear, and exact description.

My invention relates to what may be termed the spring suspension for automobiles, meaning by that term those parts of the mechanism which are used for the purpose of absorbing vibration caused by impact of the ground wheels with obstructions in the road surface.

The object of my invention is to provide springs of unusual resiliency for the absorption of shock to the ground wheel and to combine with these springs, means for increasing their lifting power at the moment that excessive shock to the ground wheels causes the axle in its upward movement to approach too near the limit of its clearance space beneath the chassis frame, thereby preventing the axle from striking the axle bumpers.

A further object is, by the same means, to prevent a recoil movement of the spring sufficiently sudden to cause the occupants of the car to be pitched upward from their seats. As a result, the undulations in the line of travel horizontally of the car body are less abrupt than they otherwise would be, thus contributing to the comfort and safety of the occupants of the car.

I accomplish these objects by dividing the spring element into main load-carrying members, and auxiliary members, and by combining these with certain lever devices, I cause a resiliency of both load-carrying springs and auxiliary springs to act to absorb vibration caused by shock to the road wheels within certain limits, but when the point is reached where further vertical movement of the axle would cause it to approach too near the limit of its clearance space beneath the chassis frame, the auxiliary springs or load supporting members are arrested from further movement, with the result that the main load carrying springs act alone and with greater force to lift the car body free of the axle and thus prevent the striking of the axle bumper under conditions of extreme speed and rough road surface.

Another object of this invention is to provide spring-mechanism comprising two classes of resilient devices, one class of a quick acting nature to initially absorb or dampen shocks more or less completely, and the other class of a slower acting nature to absorb what remains of the shocks after the action of the spring of the first class.

Figure 7:
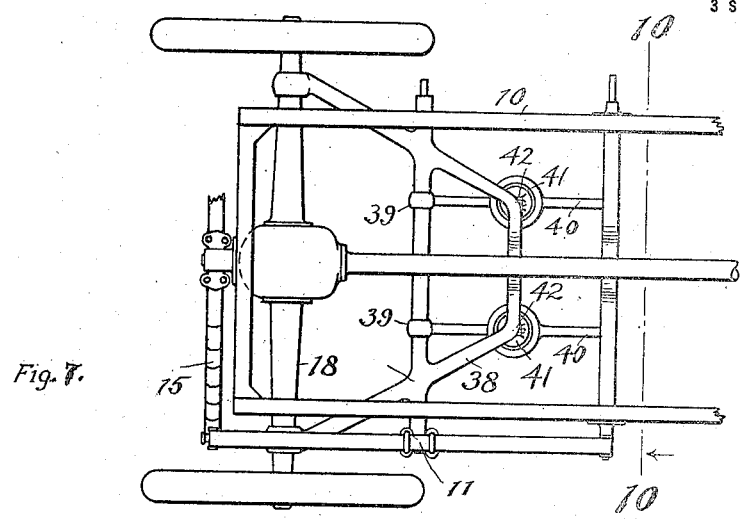
Figure 8:
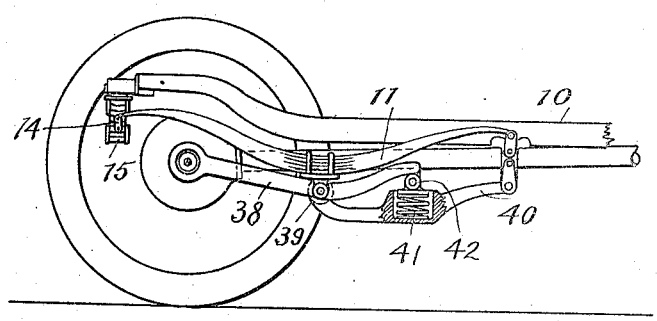
Figure 9:
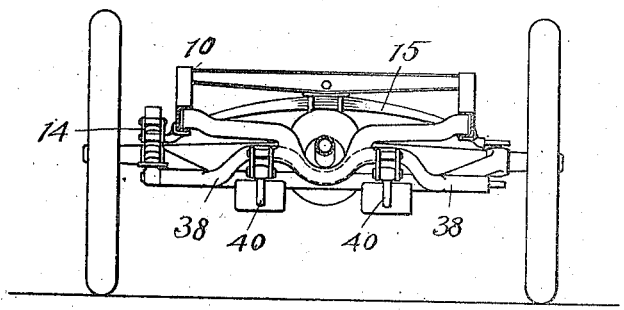

In the drawings, Figures 1, 2, 3 and 4 show a side elevation of the rear portion of the chassis equipped with one form of my invention, the near rear wheel being removed to better show the arrangement of parts. The different figures show the springs under different degrees of compression; Fig. 5 is a plan view of the construction shown in Figs. 1 to 4; Fig. 6 is a side elevation similar to Figs. 1 to 4, showing a modification wherein a pneumatic cushion is utilized in place of coil springs, as shown in Figs. 1 to 4; Figs. 7, 8 and 9 are respectively a plan, side elevation, and a transverse section along the line 10—10 of Fig. 7, showing a still further modification, wherein both rear wheels are attached to a single lever, as distinguished from the construction in the preceding views which show an individual lever for each wheel.

In the drawings, 10 represents a chassis frame which is arched for axle clearance and is connected to the running gear by my improved spring suspension. This suspension includes a main load supporting leaf spring 11 which at its forward end is connected by a shackle 12 to the chassis frame and at its rear end may be connected to the chassis frame in any one of a number of ways. For example in Figs. 1 to 6, the rear end of this spring is connected by a shackle 13 to the rear end of the chassis frame, and in Figs. 7 to 9 the rear end of this spring is connected by a compound shackle 14 to a rear platform spring 15. The middle portion of the spring 11 is pivotally connected at 16 to the middle portion of a lever 17 which at its rear end is pivotally connected to the rear axle casing 18, the axis of said connection being indicated at 19. Pivotally connected to the lever 17 at 20 adjacent the pivotal connection 16 is a second lever 21 which extends forwardly beyond the lever 17, and at its forward end is pivotally connected at 22 to a shackle 23 connected to the chassis frame 10. The levers 17 and 21 which extend lengthwise of the car and beneath, normally constitute a compound lever, and under certain conditions to be described are converted to a simple lever.

The load transmitting means between the spring 11 and running gear has embodied in it an auxiliary yieldable or resilient load supporting medium, which in the constuctions shown in Figs. 1 to 5 consists of an auxiliary spring in the form of a coil spring 24 arranged between the lapping portions of the levers 17 and 21. In the construction shown, the middle portion of the lever 21 has a cup which receives the spring 24, the latter being connected to the forward free end of lever 17 at 25. This spring 14 is so located that it resists the tendency of the load to double up or to move toward parallelism the levers or lever members 17 or 21.

Figure 1:
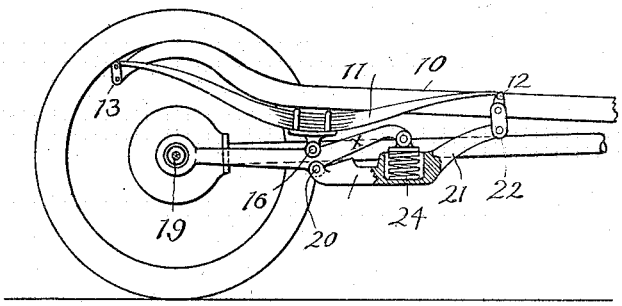
Figure 2:
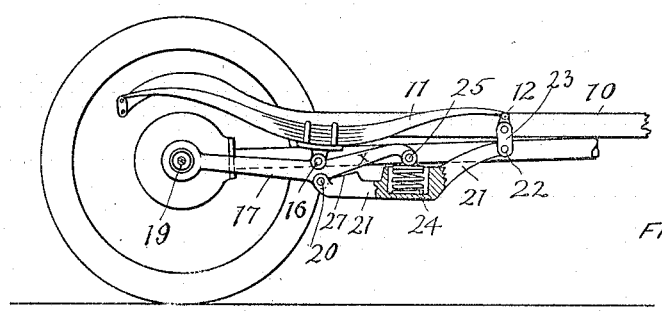

In Fig. 1, the parts are shown in the positions which they occupy relative to each other, prior to the application of load to the chassis. In Fig. 2, the parts are shown in normal positions under normal load, the auxiliary spring 24 being of sufficient strength to hold the parts in equilibrium, or to balance the downward pressure of the load when the chassis frame is practically horizontal, as shown in this figure. It will be observed that with the main load supporting and auxiliary springs normally compressed, a vertical movement of the axle due to shock to the road wheels 26 will cause the levers 17 to 21 to oscillate, the points or axis of oscillation of the lever 21 being at 22, or at the axis of its pivotal bearing with the chassis frame, and the point or axis of oscillation of the lever 17 relative to the lever 21, being at the point 20, but as the lever members 17 and 21 act together, or oscillate simultaneously in the same direction, the point 25 will be depressed as the point 20 rises, and vice versa. This action establishes a mean average point or axis of oscillation of the lever member 17, due to vertical movement of the axle somewhere between the points 20 and 25, substantially at the point marked X. This action just mentioned, viz: that under ordinary road conditions, the points 20 and 25 oscillate about a point located between the two, should be borne in mind, as it is cardinal to the invention.

Figure 3:
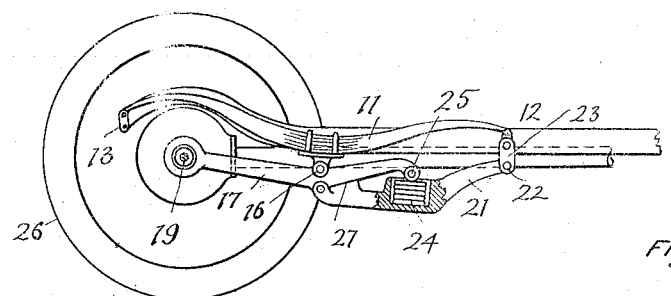
Figure 4:
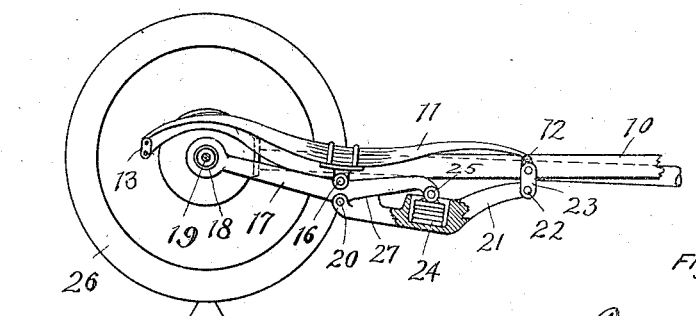

In Fig. 3 is shown the position of the parts at the moment when the car mounts a sufficiently great obstruction, that the shock due thereto exhausts the elasticity of the auxiliary springs. It will be seen that the lapping portions of the lever members have come into engagement or have closed one on the other at surfaces indicated at 27 provided for that purpose, so that further oscillatory movement of these members in the same direction and relative to each other is prevented. The amount of free movement of one lever member relative to the other is predetermined to allow the fullest possible movement of the axle in the clearance space beneath the rear end of the chassis frame, prior to the time that the auxiliary spring is arrested in its action and the load borne entirely by the leaf springs. The important point to be borne in mind is that the instant the lever members 15 and 16 come into engagement at 27, they are converted to a simple lever extending from 19 to 22, and receive the pressure of the load at 16. Under ordinary conditions, that is under conditions such that no obstructions are met by the ground wheels sufficiently great to cause contact between the lever members 17 and 21, the ground wheels will mount an obstruction and will transmit to the leaf springs 11, only a small part of their full upward movement, that is the lifting effect imparted to, or the compression of the leaf spring is not proportional to the upward movement of the ground wheels. It will be seen that the ratio of the upward movement imparted to the leaf spring to the full upward movement of the ground wheel is proportional to the ratio of the distance between the points 16 and X, to the distance between the points 19 and X. If, however, after the lever members 17 and 21 have come into contact, a further upward thrust of the road wheels should occur, as illustrated in Fig. 4, the spring will have greater lifting effect or will act with greater force to lift the load, due to the fact that whereas while the auxiliary springs were in action, the fulcrum of the lever member 17 was at X, after the lever members 17 and 21 have been moved into engagement, the fulcrum point of the now simple lever is changed to 22, and the effective leverage on the leaf spring is equal to the distance between points 20 and 22. In other words, the ratio of the increment of upward movement imparted to the spring or the lifting effect, to an increment of upward movement of the ground wheel is proportional to the ratio of the distance between the points 20 and 22 to the length of the simple lever or distance between the points 19 and 22. As the distance between the points 20 and X is much less than the distance between the points 20 and 22, and as the ratio is much greater in the second instance than in the first, it follows that the spring being strong enough to sustain the load when acting through the shorter leverage will act with much greater force to lift the load under conditions which bring into effect the longer leverage, and will thus elevate the car free from the axle when extreme shocks are encountered.

It will be quite evident that the strength of the springs can in any case be made to suit the conditions to be met, and that the proportions of the levers can be made varied to suit the different weights of cars and axle clearance allowed, but in practice, the proportions stated give very good results. The recoil of the springs causes a reverse action and prevents the recoil taking place with sufficient suddenness to pitch the occupants from their seats. Excessive shocks to the road wheels will exhaust the electricity of the auxiliary springs, as before stated, and afterward causes a further compression of the load supporting leaf spring, but as the recoil of the load supporting springs begins, it is dampened, so to speak, by the recoil of the auxiliary springs. By the action of the auxiliary springs, the support of the load sustaining leaf springs is caused to yield and thus prevents a recoil sufficiently sudden to pitch the occupants from their seats.

My invention, one embodiment of which has been described with considerable detail above, is susceptible of various modifications and the broad principle involved can be realized equally well or substantially so, in constructions which vary in numerous respects from the construction first described. For example, in Fig. 6, wherein I have shown a minor variation, I utilize for the auxiliary resilient medium a pneumatic cushion 30, instead of the coil spring 24. The construction is otherwise the same as that disclosed in Figs. 1 to 5, and in consequence the same description and reference characters will apply equally well to this figure, and further detailed description is unnecessary.

My invention may be applied as a unit to each wheel as first described, or it may be applied as a single unit to both wheels. In Figs. 7, 8 and 9, the application of my invention as a single unit to both rear wheels is shown. In this construction, the lever here designated 38 bears or supports both main load carrying springs 11, at the sides of the car, one spring being omitted in Figs. 7 and 9. In this case, the lever member 38 has a dimension transversely of the car sufficiently great to afford a bearing for both of these side springs, and so that it may be connected to the axle casing on both sides of the chassis as shown. This lever member may converge from its rear end toward the center of the car, where it laps and is pivotally connected at 39 to two companion lever members 40. Two coil springs 41 are arranged between the front end of the lever member 38 and the companion lever members 40. Although in the drawings, I have shown two forward lever members 40, it will be obvious that one lever member centrally located would do equally well, and two lever members are shown, and are preferably utilized in this particular construction, so as to avoid the necessity of placing the single lever member below the propeller shaft, the latter location being too near the ground for practical purposes. The bearings at 39, 39, and at 42, 42, (the latter being the points of connection between the lever 38 and the auxiliary springs) are sufficiently flexible to permit either wheel to ride without strain on the mechanism. When either wheel is subjected to a shock by riding over an obstruction, both coil springs in the sockets of the lever members 40 compress, but as there will be a rocking motion imparted to the lever member 38 about a horizontal axis parallel to the axle of the ground wheels, it necessarily follows that the spring on the side which receives the shock will compress more than the one on the opposite side. The rocking motion just referred to does not effect the proper functioning of the suspension in affording the resilience and in the absorption of shocks to the ground wheels, or in increasing the lifting effect of either or both of the side springs at the moment when excessive shocks to the ground wheels are encountered. As it is obvious that this suspension functions in the same manner as the constructions first described, further detail description of the action of the suspension is unnecessary. It will be observed further that auxiliary springs 24, 30 and 41 are of a class different from the load supporting springs 11. The auxiliary springs 24, 30 and 41 employed are of the type of highly resilient medium, which is capable of very rapid absorption of shock and of the dampening of the lesser vibrations, and jolts encountered on the roadway by the vehicle. When the shocks are of greater amplitude than this quick-acting medium can readily reduce to a negligible quantity, then the residue of the shock is transmitted to the slow-acting, load supporting medium whose period of vibration is of greater length and whose capacity for absorbing heavy shocks and dampening their vigor is of material advantage is saving the mechanism of the vehicle so supported and the load carried by it.

It will thus be seen that my invention is susceptible of various modifications, some of which have been described, and I do not wish therefore to be confined to any of the specific constructions herein disclosed, but aim in my claims to cover all modifications which do not involve a departure from the spirit and scope of my invention considered in its broad aspect.

Having thus described my invention, what I claim is:

1. In combination with the chassis frame and running gear of a vehicle, a spring suspension comprising a main load supporting spring, a support therefor comprising two pivotally connected members, one connected to the chassis frame and the other to the running gear, said members being adapted to axis of connection due to relative vertical movement between the chassis frame and running gear within predetermined limits, and an auxiliary yieldable medium between said members.

2. In combination with the chassis frame and running gear of a vehicle, a spring suspension comprising a main load supporting spring, and a support therefor comprising a member connected to the running gear and to said spring, and means including a yieldable medium connecting said member to the chassis frame, the parts of said support being free to oscillate relatively about an axis due to relative vertical movement between the frame and running gear within predetermined limits, and having means for thence constraining the same to oscillate as a unit about a different axis.

3. In combination with a chassis frame and running gear of a vehicle, a spring suspension comprising a main load supporting spring, and a support therefor, said support comprising members connected to each other, one of said members being attached at one end to the running gear and the other member being attached at one end only to the chassis frame, said support imparting to the spring through a certain leverage a lifting effect due to relative vertical movement between the chassis frame and running gear less than a predetermined amount, and thence imparting to the spring a lifting effect through a longer leverage when said predetermined relative movement has been exceeded.

4. In combination with the chassis frame and running gear of a vehicle, a spring suspension comprising a main load supporting spring, a support therefor comprising articulated members connected to the running gear and chassis frame, and one being connected to the spring, said members oscillating relative to each other due to relative vertical movement between the frame and running gear up to a predetermined amount, and at such time imparting a lifting effect to the spring through a certain leverage, and having means whereby when said predetermined amount is exceeded, said members oscillate as a unit and impart a lifting effect to the spring through a longer leverage.

5. In combination with the chassis frame and running gear of a vehicle, a spring suspension comprising a main load supporting spring, a support therefor comprising a plurality of coacting members and including a resilient medium, said support being connected to the running gear, frame, and spring, said members oscillating relative to each other due to relative vertical movement between the frame and running gear up to a predetermined amount and having means whereby said memebrs are held from relative oscillatory movement due to relative vertical movement between the running gear and frame exceeding said amount.

6. In combination with the chassis frame and running gear of a vehicle, a spring suspension comprising a main load supporting spring, a support therefor embodying a resilient medium and comprising in addition thereto a plurality of coacting members hinged together one of said members being attached at one end to the chassis frame and at its opposite end to the other member, and the latter being attached at one end to the running gear, said members acting to transmit to the spring a certain percentage of the vertical movement between the frame and chassis up to a predetermined amount, and transmitting to said spring a greater per cent. of said movement when the latter exceeds said amount.

7. In combination with the chassis frame and running gear of a vehicle, a spring suspension comprising a main load supporting spring, a support therefor comprising coacting members attached to the runing gear, chassis frame and spring, said members normally oscillating relatively due to relative vertical movement between the chassis frame and running gear less than a certain amount, and having means by which said parts are thence constrained to move as a unit about an axis such that the lifting effect imparted to the spring is greater when said relative movement is above said amount than when less than said amount.

8. In combination with the chassis frame and running gear of a vehicle, a side spring connected to the frame, means for transmitting the load between said spring and the running gear comprising a lever member connected to the running gear and extending forwardly therefrom beneath said spring, said spring being attached to said lever member between the ends of the latter, an oscillatory member connected to said lever member and extending forwardly beyond the same and attached at its forward end to the chassis frame, said members having coacting means which prevent relative oscillatory movement between the same after a predetermined relative vertical movement between the running gear and chassis frame.

9. In combination with the chassis frame and running gear of a vehicle, a main side spring connected to the frame, a load transmitting means between said spring and running gear, said means embodying an auxiliary spring and including a lever pivotally connected at its rear end to the running gear and extending forwardly therefrom and attached between its ends to said main spring, and a second member attached to said lever adjacent the point of connection of the latter with said main spring and extending forwardly beyond said lever, and attached at its forward end to the chassis frame, said members being capable of relative oscillatory movement about their axis of connection with each other due to relative vertical movement between the chassis frame and running gear up to a predetermined amount, and said members having means by which said relative oscillatory movement is prevented, and whereby both of said members oscillate about the connection of the forward member with the chassis frame when the relative vertical movement between the chassis frame and running gear exceeds said amount.

10. In a vehicle, the combination, with a running-gear comprising ground wheels, axle, and frame, of spring mechanism comprising two classes of resilient devices, one class for initially absorbing the shocks and another class for absorbing the residue of the shocks, a jointed connection extending from the axle to a point on the frame and connected to both the axle and frame, a spring of the first class supported by one of the parts of said connection and controlling the relative actions of said parts, and a spring of the second class supported by another part of said connection and also connected with said frame.

11. In a vehicle, the combination with a running-gear comprising ground wheels, axle, and frame, of spring mechanism comprising two classes of resilient devices, one class for initially absorbing the shocks and another class for absorbing the residue of the shocks, a connection between the axle and said frame composed of a lever made of two members, a spring of one class interposed between said members, and a spring of the other class supported by one of said members and connected to said frame.

In testimony whereof, I hereunto affix my signature in the presence of two witnesses.

RALPH P. THOMPSON.

Witnesses:
D. A. SIMMONS,
A. SLECHSCHULTZ.